Figure 1:
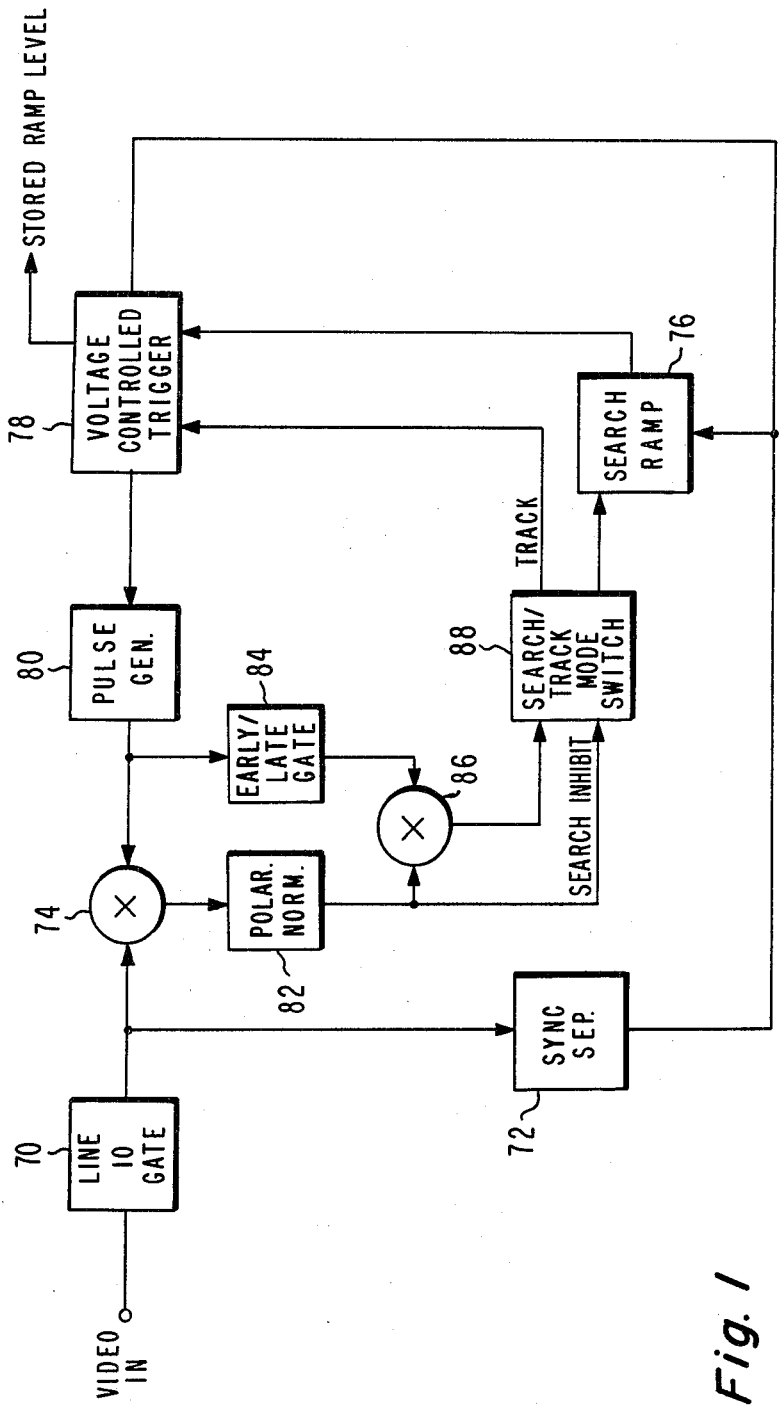

United States Patent [19]

Holmes

[11] 4,367,489
[45] Jan. 4, 1983

[54] TELEVISION GHOST DETECTION AND CANCELLATION SYSTEM CONTROLLED OVER SEVERAL LINES OF A VERTICAL RETRACE INTERVAL

[75] Inventor: David D. Holmes, Chesterfield, N.J.

[73] Assignee: RCA Corporation, New York, N.Y.

[21] Appl. No.: 230,309

[22] Filed: Jan. 30, 1981

[30] Foreign Application Priority Data

Aug. 14, 1980 [GB] United Kingdom ............... 8026515

[51] Int. Cl.³ .......................................... H04N 5/21
[52] U.S. Cl. .................................... 358/167; 358/905
[58] Field of Search ............... 358/160, 167, 166, 905, 358/36, 37

[56] References Cited

U.S. PATENT DOCUMENTS 4,053,932 10/1977 Yamaguti et al. ................... 358/167
4,128,848 12/1978 Nakagawa ........................... 358/167

Primary Examiner—Robert L. Richardson

Attorney, Agent, or Firm—E. M. Whitacre; P. J. Rasmussen; W. B. Yorks, Jr.

[57] ABSTRACT

A ghost detection and cancellation system is provided in which the horizontal sync pulses of a first sequence of lines in the vertical retrace interval are used as training signals for the detection and verification of the presence of a ghost signal. This detection procedure results in the development of a signal which reliably indicates the time location of the ghost signal with respect to the main television signal. The location indication signal is then used to select the appropriate tap of a tapped delay line. The delayed video signal from the tapped delay line is then applied to the control amplifier of a ghost canceller for the generation of a pseudo-ghost signal during a subsequent line or lines of the vertical retrace interval. The pseudo-ghost signal is combined with the original video signal to cancel its ghost signal component. By sequentially performing ghost detection and cancellation during numerous lines of the same vertical retrace interval, ghost detection and cancellation is quickly and accurately achieved.

8 Claims, 3 Drawing Figures

TELEVISION GHOST DETECTION AND CANCELLATION SYSTEM CONTROLLED OVER SEVERAL LINES OF A VERTICAL RETRACE INTERVAL

This invention relates to a television ghost signal detection and cancellation system and, in particular, to a ghost detection and cancellation system in which a ghost signal is identified and tracked over a first plurality of lines during the vertical retrace interval, and is then cancelled during subsequent lines of the retrace interval.

Copending United States patent application No. 230,310, entitled "TELEVISION GHOST DETECTOR SYSTEM," describes a system which will detect and track a television ghost signal without the use of a delay line. This system responds to a training signal by simultaneously producing a search ramp and a sequence of search pulses. The search pulses are compared with the video signal until a search pulse is produced which is in time coincidence with a ghost signal. The search ramp is halted when coincidence is achieved, with the final level of the ramp signal indicating the delay between the training signal and the ghost signal. During reception of subsequent training signals, the stored ramp level is adjusted to continuously track the ghost signal.

The aforementioned United States patent application No. 230,310 also describes control circuitry, by which a number of ghost detectors may be controlled to sequentially detect and simultaneously track a number of television ghost signals. A plurality of ghost signals may be detected in this manner for subsequent cancellation.

Copending United States patent application No. 228,593, entitled "TELEVISION GHOST CANCELLATION SYSTEM," describes a ghost cancellation system which develops a pseudo-ghost signal for combination with a video signal to cancel a ghost within the video signal. In this system, a delayed training signal is compared with its ghost, and a control amplifier is adjusted in accordance with the result of the comparison so that the delayed training signal is modified to be equal in amplitude but opposite in polarity to its ghost signal. The delayed video signal is continuously modified by the control amplifier to provide a pseudo-ghost signal which is used to cancel the ghost signal component of the video signal.

It is desirable to utilize the principles of the ghost detector and cancellation systems of the aforementioned United States patent applications to provide a system which quickly and accurately cancels a ghost signal. In accordance with the principles of the present invention, a ghost detection and cancellation system is provided in which the horizontal sync pulses of a first sequence of lines in the vertical retrace interval are used as training signals for the detection and verification of the presence of a ghost signal. This detection procedure results in the development of a signal which reliably indicates the time location of the ghost signal with respect to the main television signal. The location indication signal is then used to select the appropriate tap of a tapped delay line. The delayed video signal from the tapped delay line is then applied to the control amplifier of a ghost canceller for the generation of a pseudo-ghost signal during a subsequent line or lines of the vertical retrace interval. The pseudo-ghost signal is combined with the original video signal to cancel its ghost signal component. By sequentially performing ghost detection and cancellation during numerous lines of the same vertical retrace interval, ghost detection and cancellation is quickly and accurately achieved.

Figure 2:
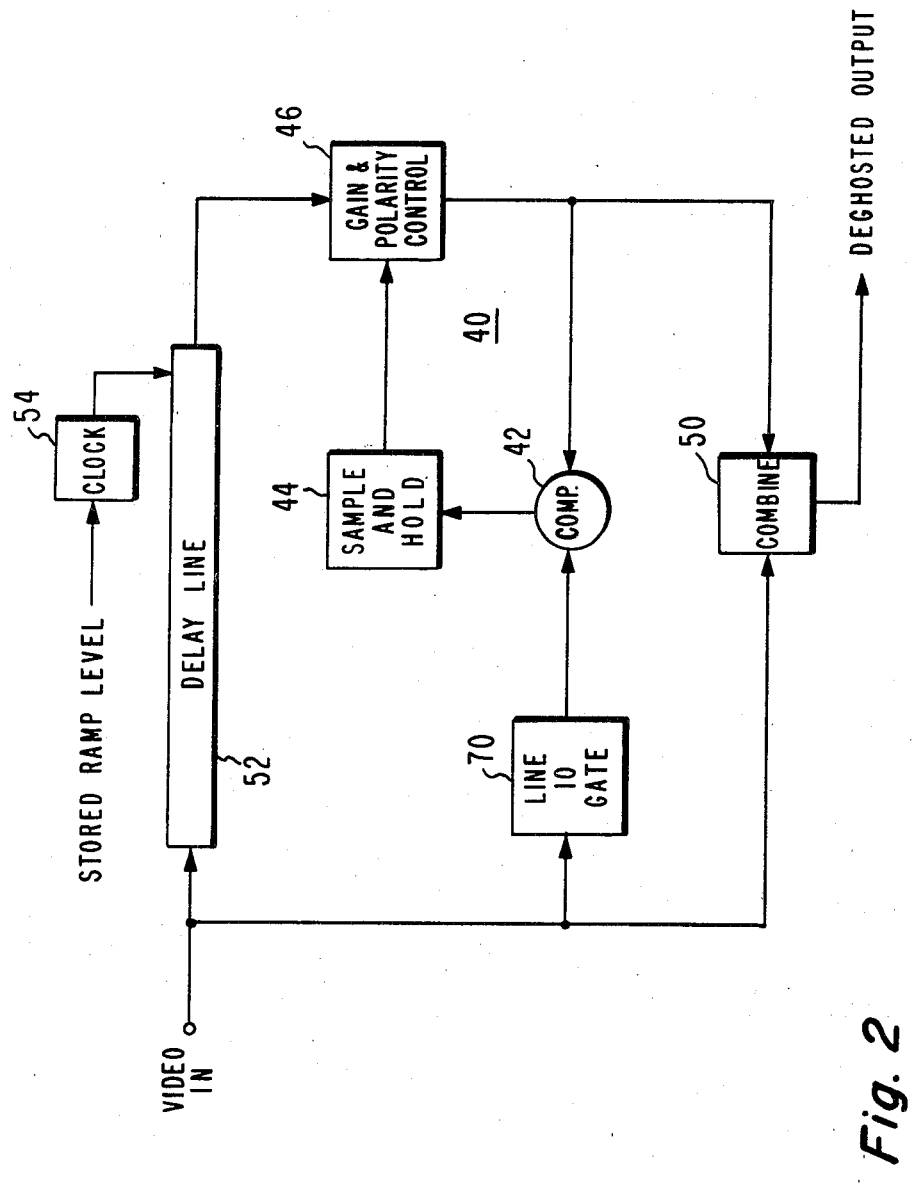
Figure 3:
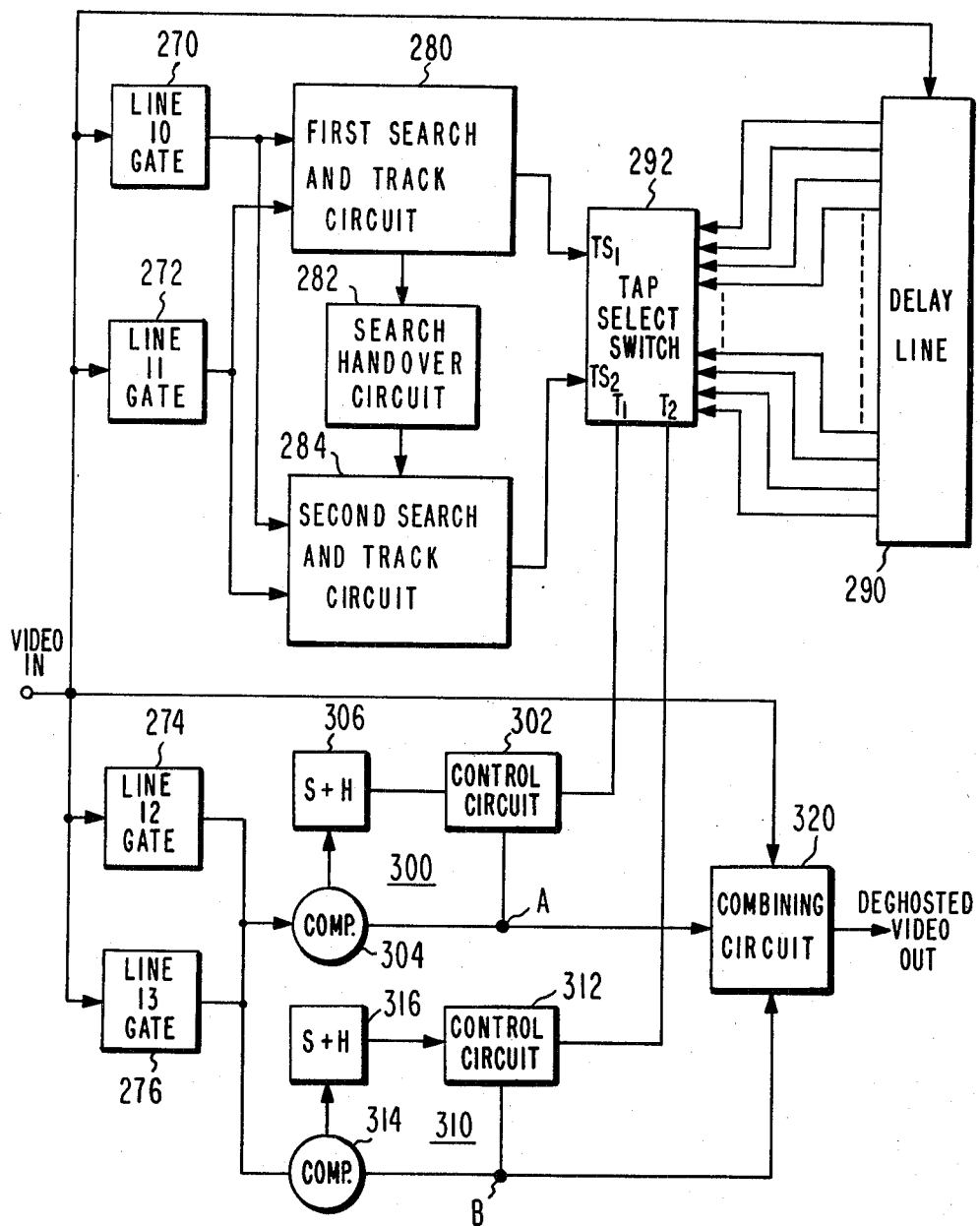

In the drawings:

FIG. 1 illustrates, in block diagram form, a ghost detector system constructed as shown in United States patent application No. 228,593, now allowed;

FIG. 2 illustrates, in block diagram form, a ghost cancellation system constructed as shown in United States patent application No. 230,310, now allowed; and FIG. 3 illustrates, in block diagram form, a ghost detection and cancellation system in which a ghost signal is located and verified during a first sequence of lines of a vertical retrace interval, and is cancelled during a second sequence of lines of the vertical retrace interval.

Referring to FIG. 1, a ghost detector system constructed as described in United States patent application No. 230,310, now allowed, entitled "TELEVISION GHOST DETECTOR SYSTEM," is shown. The contents of that application are hereby incorporated by reference. A video signal which may be contaminated with a ghost signal is applied to a line ten gate 70. The line ten gate conducts the applied video signal to its output only during line ten of the television field. Line ten is the first full line following the vertical sync pulse interval, and normally comprises a horizontal sync pulse with no picture information. The horizontal sync pulse of line ten is used as the training signal for the ghost detector, with ghosts of the sync pulse appearing during the line interval following the sync pulse.

The line ten signal is applied to a coincidence detector 74, and a sync separator 72. The sync separator 72 passes the line ten sync pulse to the exclusion of any subsequent ghost signals. The line ten sync pulse initiates the production of a search ramp by the search ramp circuit 76, and conditions a voltage controlled trigger for operation at the end of the line ten sync pulse.

The voltage controlled trigger 78 produces a sequence of trigger pulses, which are time position modulated by the search ramp. The trigger pulses cause a pulse generator 80 to produce a sequence of search pulses, which are applied to the coincidence detector 74 and an early/late gate 84. The early/late gate 84 responds to these search pulses by producing a positive-going pulse and a negative-going pulse during respective halves of each search pulse interval.

The coincidence detector 74 produces a coincidence pulse if a ghost pulse from the line ten gate is produced in coincidence with a search pulse. The coincidence pulse is converted to a normalized signal by a polarity normalization circuit 82, which signal causes a search/track mode switch to switch to a track mode. Upon the initiation of the track mode, the search ramp is halted, and the ramp level at termination is stored by the voltage controlled trigger, which is now operated in the track mode.

During the next line ten interval, the sync separator 72 and search ramp circuit 76 operate as before. The voltage controlled trigger 78 is now operated in the track mode under control of the search/track mode switch 88, and will not produce a trigger pulse until the ramp level reaches the previously stored ramp level. At that time, a trigger pulse is produced which triggers the production of a search pulse, which is again compared with the line ten signal by the coincidence detector 74, and initiates the production of an alternately positiveand negative-going early/late gate signal by circuit 84. If the ghost pulse is in the same time position relative to the sync pulse as before, the ghost pulse will be wholly or partially in time coincidence with the search pulse, and a coincidence pulse is produced by the coincidence detector. The coincidence pulse is compared with the early/late gate signal by a coincidence detector 86, which passes that portion of the early/late gate signal which is not coincident with the coincidence pulse to the search/track mode switch 86. The early/late gate circuit 84 and the coincidence detector 86 thus effectively perform a phase comparison of the search pulse and the coincidence pulse, with the result of that phase comparison being applied to the search/track mode switch 88. The phase comparison signal is applied to the previously stored search ramp level as a correction signal so that the stored signal more accurately represents the time delay between the line ten sync pulse and its ghost signal. During subsequent line ten intervals, the stored signal is again corrected and updated so that subsequent search pulses are produced fully in time coincidence with the ghost signal. In this way, the ghost signal is tracked during each line ten interval. The stored and updated search ramp level indicates the delay of the ghost signal with respect to the line ten sync signal. This stored level may be used to determine the delay of a variable delay line in a ghost cancellation system, as shown in FIG. 2.

FIG. 2 shows a ghost cancellation system constructed as described in aforementioned United States patent application No. 228,593, now allowed, entitled "TELEVISION GHOST CANCELLATION SYSTEM." The contents of that application are hereby incorporated by reference. In FIG. 2, the stored ramp level produced by the voltage controlled trigger of FIG. 1 is applied as a control signal for a variable delay line clock 54. The clock 54 responds to the control signal by clocking a delay line at a rate such that the delay line imparts a delay to an applied video signal which is substantially equal to the delay time between the line ten training signal and its ghost signal. The variable delay line may comprise a charge-coupled device delay line, for instance. When the delay line is operated with the appropriate delay, the sync pulse of an applied line ten video signal will appear at the output of the delay line 52 at the same time as its ghost signal is applied to the input of the delay line. Under these conditions, the remaining elements of the ghost cancellation system of FIG. 2 will produce a pseudo-ghost signal for cancellation of the ghost signal.

The applied video signal is coupled to a line ten gate 70, which may be the same line ten gate used in the arrangement of FIG. 1. The output of the line ten gate 70 is coupled to one input of an amplitude comparator 42. The video signal is also applied to one input of a combining circuit 50. The output of the delay line 52 is coupled to an input of a gain and polarity control circuit 46, the output of which is coupled to a second input of the amplitude comparator 42 and to a second input of the combining circuit 50. The output of the amplitude comparator 42 is coupled to an input of a sample-and-hold circuit 44, the output of which is coupled to apply a control signal to a control input of the control circuit 46. A deghosted video signal is produced at the output of the combining circuit 50.

The operation of the arrangement of FIG. 2 begins when the ghost detector system of FIG. 1 detects the presence of a ghost signal. The delay line 52 will be driven by the clock 54 at a ratee which delays the video signal by an amount of time such that the delayed line ten sync pulse appears at its output at the same time that the ghost of the line ten sync pulse appears at its input and at the input of the line ten gate. The delayed line ten sync pulse is applied to one input of the amplitude comparator 42 by the control circuit 46. At the same time, the line ten gate applies the ghost of the sync pulse to the other input of the amplitude comparator. The amplitude comparator 42 responds to these two signals by producing an error signal which represents the amplitude and polarity differences between the two signals. The error signal is stored by the sample-and-hold circuit 44, and used to develop a control signal for the control circuit 46. The control circuit 46, the amplitude comparator 42, and the sample-and-hold circuit 44 are coupled in a loop. This loop circuit 40 tends to modify the delayed sync signal amplitude and polarity, through adjustment of the control signal for the control circuit 46, until the delayed signal at the output of the control circuit 46 converges to a signal which is the same amplitude but the opposite polarity of the line ten ghost. This signal, termed the pseudo-ghost signal, is then combined with the original video signal by the combining circuit 50 to cancel its ghost signal component.

Once the error signal produced by the amplitude comparator 42 has ended, the value of the control signal retained by the sample-and-hold circuit 44 remains constant until the next line ten interval. During the picture interval of the television field, the video signal continues to pass through the delay line 52, and the amplitude and polarity of the delayed signal are continuously modified by the control circuit 46. The pseudo-ghost signal developed thereby is applied to the combining circuit 50 to cancel the ghost signal component of the video signal. The value of the control signal is updated during each line ten interval when the line ten gate 70 passes another ghost to the amplitude comparator 42.

The performance of the ghost detector of FIG. 1 and the ghost cancellation system of FIG. 2 is retarded by the fact that the training signal occurs only once each television field, during line ten. The infrequently occurring training signal extends the time required to proceed from ghost detection to complete cancellation. This is because system time constants are used to provide noise immunity and to stabilize the systems against oscillations. For instance, there will generally be a time constant associated with the phase detector formed by the early/late gate 84 and the coincidence detector 86 of the ghost detector system. This time constant can extend the time required for the stored ramp level to reach a final value until several sampling intervals have occurred. Likewise, the time constant of the sample-and-hold circuit 44 of the ghost cancellation system can extend the time required for the loop 40 to converge to a final control signal value. Several sampling intervals may be required for the system to satisfactorily converge so that the ghost of the video signal is no longer visible.

In accordance with the principles of the present invention, a system is provided which will quickly and accurately converge to cancel a ghost signal. This system utilizes the horizontal sync pulses of a plurality of lines of a vertical retrace interval as training signals for ghost detection. By examining a number of consecutive lines, the ghost may be detected and its time location verified several times during a single television field. This information provides effective correlation of the initial ghost detection, so that the ghost detector is substantially immune to the effects of noise. Following the definitive detection of the ghost, the ghost signal can be accurately eliminated by utilizing the horizontal sync pulses of a succeeding plurality of lines of the retrace interval as training signals for a ghost cancellation system. The system is therefore capable of quickly converging to produce an accurate pseudo-ghost signal.

The ghost detector of FIG. 1 and the ghost cancellation system of FIG. 2 are exemplary of the type of systems which may be advantageously employed to provide the features of the present invention. A system illustrating the principles of the present invention is shown in FIG. 3.

Referring to FIG. 3, a video signal is applied to inputs of a line ten gate 270, a line eleven gate 272, a line twelve gate 274, a line thirteen gate 276, a combining circuit 320, and a tapped delay line 290. The outputs of the line ten and line eleven gates 270 and 272 are coupled to inputs of first and second search and track circuits 280 and 284. The first search and track circuit 280 is coupled to the second search and track circuit by a search handover circuit 282. The line eleven, twelve and thirteen gates 272, 274 and 276 are constructed in a similar manner as line ten gate 270, and pass respective lines eleven, twelve, and thirteen of the applied video signal. These lines are similar to line ten; each comprises a sync pulse followed by no picture information. In lieu of separate line ten, eleven, twelve and thirteen gates, the lines ten and eleven gates may be replaced with a single gate which passes lines ten and eleven at its output, and the lines twelve and thirteen gates may be replaced with a single gate which passes lines twelve and thirteen at its output. The search and track circuits 280 and 284, for example, each contain all of the elements of FIG. 1, with the exception of the line ten gate. The two circuits 280 and 284 are controlled to detect and track different ghost signals by the search handover circuit 282, which may be of a form described in United States patent application No. 230,310, now allowed, entitled "TELEVISION GHOST DETECTION SYSTEM". As explained in that application, the form of the search handover circuit may permit the sharing of the same sync separator and search ramp circuit by the two search and track circuits.

Each search and track circuit 280 and 284 is capable of developing its own stored ramp signal, which corresponds to the time delay of a respectively different ghost signal. The stored ramp level of each signal is applied to a tap select input of a tap select switch 292. The tap select switch 292 is coupled to the taps of the tapped delay line 290, and couples respective ones of the taps to outputs $T_1$ and $T_2$ in accordance with the values of the input signals at tap select inputs $TS_1$ and $TS_2$. The use of an output tapped delay line 290 permits the detection and cancellation of more than one ghost signal. If it is desirable to cancel only one ghost signal, an input tapped delay line may be used in place of the output tapped delay line.

Outputs $T_1$ and $T_2$ of the tap select switch 292 are connected to gain and polarity control circuits 302 and 312 of ghost cancellation loops 300 and 310, respectively. Control circuit 302 has an output coupled to an amplitude comparator 304 and to an input of the combining circuit 320. Amplitude comparator 304 has a second input coupled to the outputs of line twelve and thirteen gates 274 and 276. The output of amplitude comparator 304 is coupled to the input of a sample-and-hold circuit 306, the output of which is coupled to the control input of control circuit 302.

Control circuit 312 has an output coupled to an input of an amplitude comparator 314 and to an input of the combining circuit 320. A second input of amplitude comparator 314 is coupled to the outputs of line twelve and thirteen gates 274 and 276. The output of amplitude comparator 314 is coupled to the input of a sample-and-hold circuit 316, the output of which is coupled to the control input of control circuit 312.

The combining circuit 320 produces a deghosted video signal.

In operation, the line ten gate 270 applies the line ten sync and ghost signals to the first search and track circuit 280 for the acquisition of a ghost signal. If the circuit 280 detects a ghost signal, the search handover circuit 282 activates the second circuit 284, which searches for a second ghost signal. When line ten contains two or more ghost signals, the search and track circuits will be tracking the first and second ghost signals, respectively, by the end of line ten.

During line eleven, the circuits 280 and 284 will track the ghost signals that they detected during line ten. The ramp voltages which were determined when the ghost signals were acquired will be updated by the tracking signal resulting from the operation of the early/late gate and second coincidence detector of each circuit. The updated ramp voltages will then represent a more precise determination of the delay time of each ghost signal with respect to the sync signal. The search and track circuits will use the updated ramp voltages, which are representative of the delay of each ghost, to develop tap select signals for the tap select switches 292.

It is possible that one or both of the search and track circuits could be deceived by impulse noise following the line ten sync pulse, causing the circuits to identify impulse noise pulses as ghosts. If this should happen, the search and track circuits will try to track the false ghost signals by looking for their reoccurrence at the same relative time of the time interval following the line eleven sync pulse. The randomness of impulse noise makes it unlikely that the search and track circuits will again detect noise pulses in the same time location. Accordingly, the search and track circuits will not produce tap select signals for the tap select switch 292 under these conditions. Two consecutive detections of a ghost at the same time location relative to the sync pulses are required for the production of a tap select signal. This correlation of two consecutive identifications of a ghost makes the search and track circuits relatively immune to noise detection. If further correlation is desired for even better noise immunity, subsequent lines of the vertical retrace interval may also be applied to the search and track circuits for further ghost signal verification.

The tap select signals are applied to the tap select inputs $TS_1$ and $TS_2$ of tap select switch 292. The tap select switch will respond to these signals by connecting taps of the delay line 290 with appropriate delays to the outputs $T_1$ and $T_2$. Thus, the video signal at output $T_1$ will be delayed with respect to the video signal at the input of the delay line by the delay time determined by the first search and track circuit 280. Likewise, the video signal at output $T_2$ will be delayed by the delay determined by the second circuit 284.

The ghost cancellation loops 300 and 310 are constructed to operate in the same manner as loop 40 of the arrangement of FIG. 2. During line twelve, the coincidence detector 304 determines the amplitude and polarity difference between the first sync pulse ghost of line twelve and the delayed line twelve sync pulse. This information is sampled and retained by sample-and-hold circuit 306, and used to develop a control signal for control circuit 302. The control circuit is adjusted to modify the delayed video signal so as to converge toward the production of a first pseudo-ghost signal at the output of control circuit 302 at point A. During line twelve, the second ghost cancellation loop 310 is performing a similar cancellation of the second ghost, and develops a second pseudo-ghost signal at point B.

During line thirteen, the cancellation loops again are operative to refine the pseudo-ghost signals. The signals stored by the sample-and-hold circuits 306 and 316 are updated to produce more precise control signals for the control circuits 302 and 312. The signals developed at points A and B are now more precise inverse replicas of the respective first and second ghost signals.

The pseudo-ghost signals are applied to the combining circuit 320, where they are combined with the original video signal to cancel the first and second ghost signals. The deghosted video output signal is now free of the first and second ghosts.

The arrangement of FIG. 3 may be expanded if desired to cancel three ghosts, four ghosts, or as many ghosts as may be desired. Also, additional lines of an NTSC signal may be applied to the system to provide even faster and more precise ghost cancellation, depending upon the time constants of the system. Lines 10 through 16 of an NTSC signal may be used as training signals for the system. Line 17 may contain a Vertical Interval Test Signal, and line 19 may contain a VIR signal; hence, lines subsequent to line 16 should not be used as training signals, since it cannot be assumed that they will be free of video information.

What is claimed is:

1. In a television receiver, including a source of video signals which are modulated at a field rate, wherein each field comprises a vertical scanning interval and a vertical retrace interval, and said vertical retrace interval includes a succession of line intervals, each of which contains a horizontal sync signal, said video signals being subject to contamination by a ghost signal; a television ghost detection and cancellation system comprising:

first means having an input coupled to said source of video signals and an output for passing a first number of line intervals of said succession of line intervals to said output;

a ghost detector circuit having an input coupled to the output of said line interval passing means, and responsive to a first one of said first number of line intervals for producing an output signal indicative of the delay of a ghost of said horizontal sync signal of said first line interval with respect to said horizontal sync signal of said first line interval when a ghost signal is present, said ghost detector circuit being responsive to a second one of said first number of line intervals which succeeds said first one, when said ghost detector circuit has produced said output signal in response to said first line interval, for adjusting the value of said output signal as required to indicate the delay of a ghost of said horizontal sync signal of said second line interval with respect to said horizontal sync signal of said second line interval when a ghost signal is present;

second means, having an input coupled to said source of video signals, and an output for producing video signals delayed as a function of the value of said output signal of said ghost detector circuit;

third means having an input coupled to said source of video signals and an output for passing a line interval of said succession of line intervals which succeeds said first number of line intervals;

a ghost cancellation system having a first input coupled to the output of said second means and a second input coupled to the output of said third means, and responsive to said delayed video signals and said line interval succeeding said first number of line intervals for producing a pseudo-ghost signal which is substantially equal in amplitude and opposite in phase to said ghost signal when said ghost signal is present; and means for combining said video signals and said pseudo-ghost signal to develop a deghosted video signal when said ghost signal is present.

2. The arrangement of claim 1, wherein said third means passes a second number of line intervals of said succession of line intervals which succeeds said first number of line intervals, and wherein said ghost cancellation system is responsive to said delayed video signals and a plurality of line intervals of said second number of line intervals for producing said pseudo-ghost signal.

3. The arrangement of claim 2, wherein said video signals comprise NTSC standard signals, said first means passes lines ten and eleven of a field of said NTSC standard signals, and said third means passes lines twelve and thirteen of said NTSC standard signals.

4. The arrangement of claim 1, wherein said second means comprises an output tapped delay line having a plurality of output taps.

5. The arrangement of claim 4, further comprising a tap select switch having an input responsive to said output signal of said ghost detector circuit for electrically connecting one of said output taps to said first input of said ghost cancellation system.

6. The arrangement of claim 1 or 5, wherein said ghost detector circuit includes means responsive to the horizontal sync signal of said first and second ones of said first number of line intervals for developing a varying search signal; and means responsive to a ghost of said horizontal sync signal of said first line interval for storing the value of said search signal upon the occurrence of said ghost.

7. The arrangement of claim 6, wherein said ghost detector circuit further comprises means responsive to the horizontal sync signal of said second one of said first number of line intervals for developing a track signal when said varying search signal attains the value of said stored value; means for producing a phase comparison signal indicative of the phase relationship between said track signal and the ghost of said horizontal sync signal of said second line interval; means for utilizing said phase comparison signal to adjust the value of said stored search signal as required to indicate the delay of said ghost of said horizontal sync signal of said second line interval with respect to said horizontal sync signal of said second line interval; and means for utilizing said adjusted stored value to produce said output signal of said ghost detector circuit.

8. In a television receiver, including a source of video signals which are modulated at a field rate, wherein each field comprises a vertical scanning interval and a vertical retrace interval, and said vertical retrace interval includes a succession of line intervals, each of which contains a horizontal sync signal, said video signals being subject to contamination by a ghost signal; a television ghost detection system comprising:

means having an input coupled to said source of video signals and an output for passing a number of line intervals of said succession of line intervals to said output; and a ghost detector circuit having an input coupled to the output of said line interval passing means, including means responsive to the horizontal sync signal of first and second line intervals of said number of line intervals for developing a varying search signal;

means responsive to a ghost of said horizontal sync signal of said first line interval, when a ghost signal is present, for storing the value of said search signal upon the occurrence of said ghost;

means responsive to the reception of said second line interval of said number of line intervals for developing a track signal when said varying search signal attains the value of said stored value;

means for producing a phase comparison signal indicative of the phase relationship between said track signal and the ghost of said horizontal sync signal of said second line interval when a ghost signal is present;

means for utilizing said phase comparison signal to adjust the value of said stored search signal as required to indicate the delay of said ghost of said horizontal sync signal of said second line interval with respect to said horizontal sync signal of said second line interval; and means, operative only upon the storage of the value of said search signal upon the occurrence of said ghost during said first line interval, followed by the production of said phase comparison signal upon the occurrence of said ghost during said second line interval of the same vertical retrace interval as said first line interval, for utilizing said adjusted stored value to produce an output signal of said ghost detector circuit which is indicative of the delay of a ghost of said horizontal sync signal of said second line interval with respect to said horizontal sync signal of said second line interval when a ghost signal is present.

* * * * *